(12) United States Patent
Aubert et al.

(10) Patent No.: US 11,075,018 B2
(45) Date of Patent: Jul. 27, 2021

(54) TRANSFER SYSTEM FOR SEALED ENCLOSURE COMPRISING A DEVICE FOR SEALED CONNECTION WITH A CLOSED VOLUME

(71) Applicant: GETINGE LA CALHENE, Vendome (FR)

(72) Inventors: Arthur Aubert, Pierreville (FR); Wenceslas Daniel, Vineuil (FR)

(73) Assignee: GETINGE LA CALHENE, Vendome (FR)

( * ) Notice: Subject to any disclaimer, the term of this patent is extended or adjusted under 35 U.S.C. 154(b) by 0 days.

(21) Appl. No.: 16/433,633

(22) Filed: Jun. 6, 2019

(65) Prior Publication Data

US 2019/0378630 A1 Dec. 12, 2019

(30) Foreign Application Priority Data

Jun. 11, 2018 (FR) ...................................... 1855085

(51) Int. Cl.
*G21F 7/005* (2006.01)
*B25J 21/00* (2006.01)
*B25J 1/08* (2006.01)

(52) U.S. Cl.
CPC ................ *G21F 7/005* (2013.01); *B25J 1/08* (2013.01); *B25J 21/00* (2013.01)

(58) Field of Classification Search
CPC ....... B25J 1/08; B25J 1/10; B25J 21/00; B25J 9/0048; B25J 9/046; G21F 7/005; G21F 7/062
USPC ..................................... 414/292, 733, 744.6
See application file for complete search history.

(56) References Cited

U.S. PATENT DOCUMENTS

| | | | | |
|---|---|---|---|---|
| 5,049,029 A | * | 9/1991 | Mitsui | H01L 21/6838 414/744.5 |
| 5,085,556 A | * | 2/1992 | Ohtomi | B25J 9/023 414/744.3 |
| 5,222,409 A | * | 6/1993 | Dalakian | B25J 9/046 414/733 |

(Continued)

FOREIGN PATENT DOCUMENTS

| | | | | |
|---|---|---|---|---|
| EP | 0076947 A1 | * | 4/1983 | ............ B25J 9/104 |
| EP | 0105656 A2 | * | 4/1984 | ............ B25J 9/046 |

(Continued)

OTHER PUBLICATIONS

Preliminary French Search Report for French Patent Application No. 1855085, dated Apr. 18, 2019.

*Primary Examiner* — James Keenan
(74) *Attorney, Agent, or Firm* — Pearne & Gordon LLP

(57) ABSTRACT

Transfer system for sealed enclosure, said sealed enclosure defining a first closed volume and comprising at least one device for sealed connection to a second closed volume, said transfer system being intended to be arranged in said enclosure (E) and to be fixed to a wall thereof, said transfer system comprising at least one arm, a first rotating hinge between the arm intended to be arranged between the arm and said wall of the enclosure, said first rotating hinge comprising a first axis of rotation, a chute and a second rotating hinge between the arm and the chute, said second rotating hinge comprising a second axis of rotation, the chute comprising a docking edge configured to cooperate with the device for sealed connection.

15 Claims, 12 Drawing Sheets

(56) References Cited

U.S. PATENT DOCUMENTS

| | | | |
|---|---|---|---|
| 5,421,626 A | 6/1995 | Glachet | |
| 6,057,662 A * | 5/2000 | McAndrew | G05B 19/4103 414/744.6 |
| 6,592,323 B1 * | 7/2003 | Hsieh | B66C 1/0212 414/733 |
| 6,840,732 B2 * | 1/2005 | Minami | B65G 47/904 414/744.5 |
| 8,286,448 B2 * | 10/2012 | Kuz | C03B 9/447 414/733 |
| 8,381,609 B2 * | 2/2013 | Palau | B25J 9/1065 74/490.05 |
| 8,950,624 B2 | 2/2015 | Sacca | |
| 9,168,520 B2 * | 10/2015 | Armau | F16J 13/18 |
| 9,754,691 B2 | 9/2017 | Dufour et al. | |
| 2013/0167442 A1 | 7/2013 | Sacca | |
| 2018/0327012 A1 | 11/2018 | Giboyau et al. | |
| 2019/0184551 A1 * | 6/2019 | Shafer | B25J 9/046 |

FOREIGN PATENT DOCUMENTS

| | | | |
|---|---|---|---|
| EP | 1930130 A1 * | 6/2008 | B25J 9/046 |
| FR | 2 695 343 A1 | 3/1994 | |
| FR | 2751576 A1 * | 1/1998 | B25J 9/042 |
| WO | WO-8401537 A1 * | 4/1984 | B25J 9/046 |
| WO | WO-9011165 A1 * | 10/1990 | B25J 9/046 |
| WO | 2011/061464 A1 | 5/2011 | |

* cited by examiner

TRANSFER SYSTEM FOR SEALED ENCLOSURE COMPRISING A DEVICE FOR SEALED CONNECTION WITH A CLOSED VOLUME

TECHNICAL FIELD AND PRIOR ART

The present application relates to a transfer system for a sealed enclosure delimiting a closed volume intended to be connected to another closed volume, the sealed enclosure comprising a device for sealed connection between the two closed volumes, an enclosure comprising such a system, a method for actuating said transfer system and a transfer method.

In a certain number of industrial sectors, among which may be cited the nuclear, medical, pharmaceutical and food processing sectors, it is necessary or desirable to carry out certain tasks in a confined atmosphere, either in order to protect the personnel, for example from radioactivity, toxicity, etc., or conversely to be able to carry out these tasks in an aseptic or dust-free atmosphere, or finally both simultaneously.

The transfer of apparatus or product from one closed volume to the other, without at any moment the leak tightness of each of these volumes vis-à-vis the exterior being broken, poses a problem that is awkward to overcome. This problem may be resolved by a double door connection device.

Such a double door device provided with a multiple safety control is for example known from the document FR 2 695 343. Each volume is closed by a door mounted in a flange. Each door is coupled to its flange by a bayonet connection and the two flanges are intended to be coupled to each other by a bayonet connection. This system is also designated rapid transfer port (RTP).

In the case where one of the closed volumes is formed by a container and the other volume by a glovebox, the transfer is made in the following manner. The flange of the container comprises on its external periphery lugs intended to cooperate with a corresponding shape of the flange of the glove box. The flange of the container is introduced into the flange of the glovebox, the container is oriented so as to make the lugs correspond with the corresponding shape. A first rotation of the container along the axis of its door makes it possible to couple the flange of the container with the flange of the glovebox by the bayonet connection. By means of a second rotation of the container, along the same axis and in continuity with the first rotation, the door of the container is pivoted with respect to the container, ensuring both a coupling by another bayonet connection with the door of the glovebox and an uncoupling of the new assembly formed by the two docked doors vis-à-vis the door and glovebox flanges. A handle control situated in the glove box makes it possible to unlock a safety mechanism and to free the passage between the two volumes. In the case of an aseptic atmosphere, the exterior faces of the two doors being in contact with each other in a sealed manner, they cannot contaminate the interior of the volumes.

This type of enclosure is used for the manufacture of products under controlled atmosphere, for example in the pharmaceutical field for the manufacture of medicines and their packaging. Filling lines are for example arranged in the enclosures. Objects from the exterior may then be transferred to the interior of the enclosure, for example bottles or closures. The objects are contained in a bag provided with a flange and a door, the flange being connected in a sealed manner to the flange of the enclosure. To facilitate the transfer of objects, for example to pour them into a vibrating bowl of the filling line, a transfer system is implemented in the enclosure, comprising an element forming a funnel, called chute and which is positioned bearing on or in the flange of the enclosure inside the enclosure to receive objects that come from the bag and to guide them towards their destination, for example the vibrating bowl.

An example of such a transfer system is described in the document U.S. Pat. No. 8,950,624. The chute is hinged with respect to the wall of the enclosure between a docked position, in which it docks with the flange of the enclosure and it borders the opening of the enclosure, and a moved away or rest position, in which the chute is moved away from the opening of the enclosure so as not to hinder the putting back in place of the door of the enclosure.

The chute is fixed on an arm which is rotationally hinged on the wall of the enclosure. The arm can be actuated from the exterior by a lever. When it is wished to put in place the chute on the opening, the arm is rotated in the direction of the wall, the chute which forms a rigid assembly with the arm is folded back against the wall and is applied against the flange of the enclosure and it borders its opening. To move away the chute, the arm is rotationally displaced in the opposite direction. The transfer system has a certain bulk, which imposes conditions in the configuration of the volume of the enclosure, notably in terms of dimensions, so that in rest position the transfer system does not hinder handling operations in the enclosure.

SUMMARY OF EXEMPLARY EMBODIMENTS

It is consequently an aim of the present application to describe a transfer system for sealed enclosure comprising a device for sealed connection offering greater freedom in the production of the enclosure.

The aforementioned aim is attained by transfer means intended to be mounted in a sealed enclosure comprising a device for sealed connection to a closed volume, including a shaft mounted, by a longitudinal end, rotationally hinged on a wall of the enclosure and a chute mounted rotationally hinged at the level of the other longitudinal end of the arm, and means for rotationally displacing the arm with respect to the wall and means for rotationally displacing the chute with respect to the arm, between a rest position of the chute and a docking position of the chute.

Due to the rotational mobility of the chute with respect to the arm, it may be oriented in rest position so as to reduce the bulk of the transfer system, and thus to reduce the constraints in the design of the enclosure, notably to reduce the volume to house the transfer system, and thus to reduce the volume of the enclosure.

In other words, the orientation of the chute is made at least in part independent of the orientation of the arm by adding a pivot hinge between the arm and the chute, which makes it possible to produce a transfer system having great conformability, and thus to offer greater freedom in the design of the enclosure.

In a particularly advantageous embodiment, the transfer system is such that it maintains the chute in a given orientation with respect to the connection device. For example, the arm is hinged on the wall bearing the connection device and the transfer system comprises means ensuring a displacement of the chute such that the chute permanently retains a parallel orientation with respect to the connection device and thus to the wall bearing the device. Thus, in rest position, the chute is brought closer to the wall and extends towards the interior of the enclosure and not towards the exterior of the enclosure, which thus does not require providing a supplementary volume uniquely to house the transfer system.

For example the means for ensuring the parallel displacement of the docking edge of the chute comprise pinions and shafts.

In a very advantageous manner, the actuation of the transfer system is performed by an electric motor.

In an example of transfer method, a maintaining of the chute in a fixed orientation is ensured during its displacement from a rest state to a state of docking to the connection device, in which the axis of the chute and/or the axis of the docking edge of the chute is aligned with the longitudinal axis of the opening.

For example, the chute is displaced substantially vertically between the rest position and docked position, the chute and the arm then pivot simultaneously around their axis of rotation and ensuring that the docking edge of the chute remains parallel to the opening of the connection and the wall, in the event where the opening and the wall are in the same plane. The chute may be lowered to pass from the rest state to the docked state and vice versa.

The subject-matter of the present application is a transfer system for sealed enclosure, said sealed enclosure defining a first closed volume and comprising at least one device for sealed connection configured to connect the first closed volume to a second closed volume, said transfer system being intended to be arranged in said enclosure, said transfer system comprising:

at least one arm intended to be rotationally mounted on a wall of the sealed enclosure through a first rotating hinge comprising a first axis of rotation, a chute, said chute comprising:
  a docking edge configured to cooperate with the device for sealed connection; and
  a pouring edge, and a second rotating hinge between the arm and the chute, said second rotating hinge comprising a second axis of rotation.

According to an additional characteristic, the system comprises means for rotationally displacing the arm and the chute around the first hinge axis and the second hinge axis.

According to an additional characteristic, the first axis of rotation and the second axis of rotation are parallel.

According to another additional characteristic, the system comprises orientation maintaining means for maintaining the orientation of the chute during its displacement in said enclosure.

Considering the longitudinal axis of the docking edge comprising a longitudinal axis, the orientation maintaining means are such that the longitudinal axis of the docking edge is aligned with the axis of an opening of the connection device and/or perpendicular to the wall of the enclosure in which is mounted the device for sealed connection.

For example, the orientation of the orientation maintaining means are such that the docking edge is displaced in planes parallel with respect to each other.

According to an exemplary embodiment, the orientation maintaining means comprise mechanical means between a first interior axis extending along the first axis of rotation, and a second interior axis extending along the second axis of rotation, said second interior axis being rotationally secured to the chute. The mechanical means may comprise an interior shaft connected to the first interior axis and to the second interior axis by angle transmissions.

In another exemplary embodiment, the mechanical means comprise a toothed belt or a chain meshing with the first interior axis and the second interior axis, the first interior axis and the second interior axis being splined.

The system may comprise actuating means including at least one electric motor to rotate the system around the first axis of rotation.

According to another additional characteristic, the system comprises a first electric motor to displace the arm around the first axis of rotation and a second electric motor to displace the chute around the second axis of rotation.

According to another additional characteristic, the system comprises means for detecting the configuration of the transfer system and/or the opening state of the connection device.

The application also relates to an enclosure defining a first closed volume and comprising a device for sealed connection to a second closed volume, said connection device being mounted in a wall of said enclosure, and comprising a transfer system of the present application.

For example, the first rotating hinge of the transfer system is fixed on the wall in which is mounted the connection device.

According to an additional characteristic, the connection device comprises bayonet connection means.

The subject matter of the present application is also an insulator system comprising a device for sealed connection to a confinement unit, a transfer system and another confinement unit.

The subject matter of the present application is also a method for actuating a transfer system mounted on a wall of an enclosure defining a first closed volume and comprising a device for sealed connection to a second closed volume, said device for sealed connection comprising an opening of axis X, said transfer system comprising a chute provided with a docking edge of axis X2 and hinged around a first axis of rotation and a second axis of rotation, said actuating method comprising a phase of the chute coming closer to the connection device to place the chute in a docking position, and a phase of the chute moving away from the connection device to place the chute in a rest position, during each of the phases of coming closer and moving away the chute being rotated around the first axis of rotation and around the second axis of rotation.

According to an additional characteristic, the chute is rotated simultaneously around the first axis of rotation and the second axis of rotation respectively.

According to another additional characteristic, in the coming closer phase and in the moving away phase, the axis of the docking edge remains parallel to the axis of the connection device.

According to another additional characteristic, in rest position a pouring edge of the chute is oriented towards the interior of the enclosure.

The subject matter of the present application is also a method for transferring objects between a second volume and the first volume of the enclosure of the present application, comprising:

a connection of the second closed volume to the connection device,
removal of the doors of the enclosure and the second closed volume,
putting in place the chute,
transfer of the objects from the second closed volume to the interior of the enclosure,
removal of the chute,
putting the doors back in place.

The connection may be obtained by rotation of the second closed volume with respect to the enclosure, so as to ensure a connection between the flanges of the second closed volume and the connection device and between a door of the second closed volume and the door of the enclosure.

The method may comprise a detection of the configuration of the transfer system and a detection of the position of the doors and an emission of a signal to the transfer system to bring closer or not the chute of the connection device.

BRIEF DESCRIPTION OF THE DRAWINGS

The subject matters of the present application will be better understood on the basis of the description that follows and the appended drawings in which.

DETAILED DESCRIPTION OF PARTICULAR EMBODIMENTS

Figure 1:
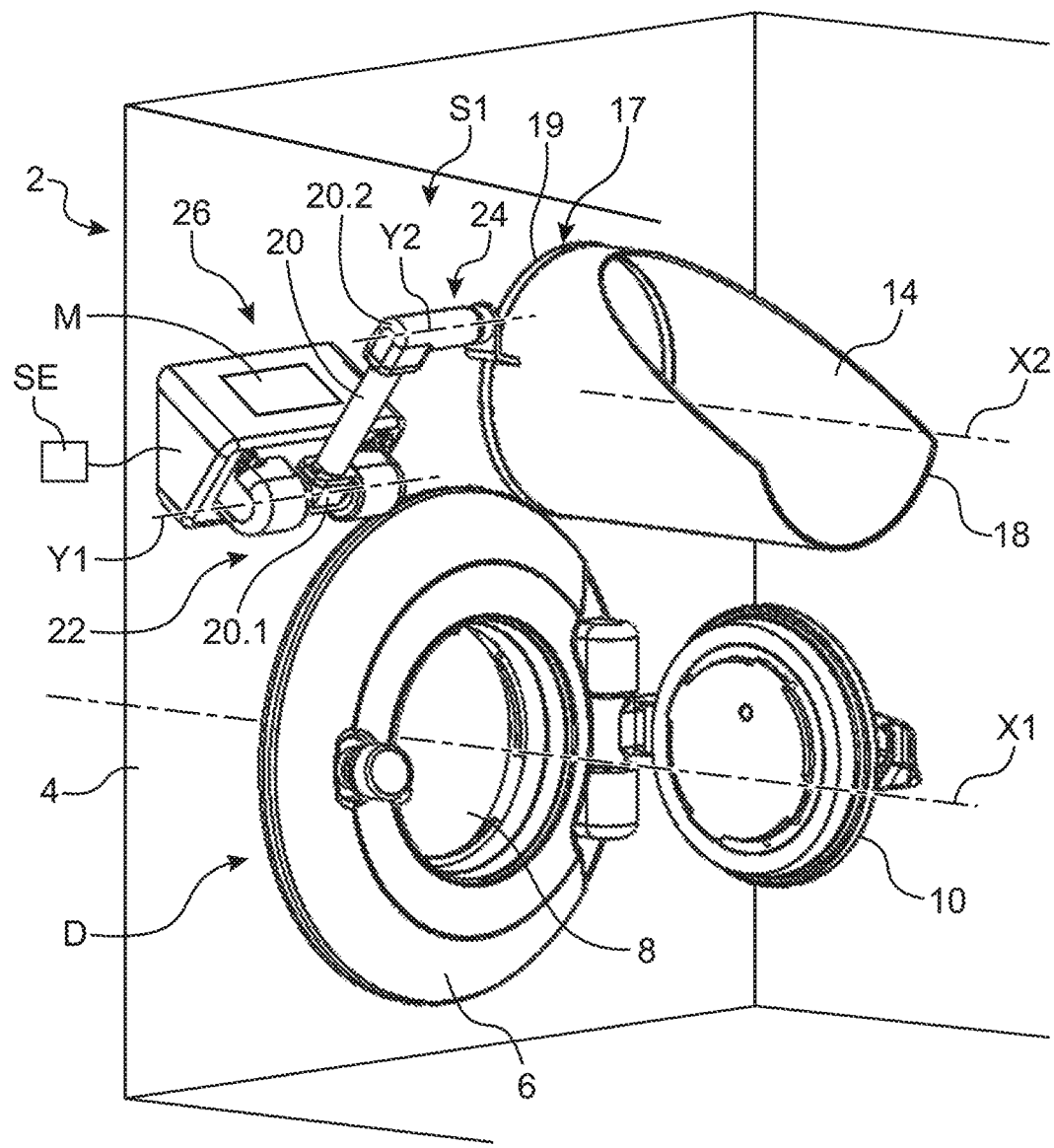
FIG. 1 is a perspective view of the inside of an enclosure provided with a transfer system according to a first exemplary embodiment according to a first embodiment, the transfer system being in rest position.

In FIG. 1 may be seen an example of sealed enclosure, represented in transparency, provided with a sealed transfer system according to a first exemplary embodiment of a first embodiment.

The enclosure 2 comprises walls delimiting a sealed volume. At least one 4 of the walls comprises a device for sealed connection D to an external sealed system, for example another enclosure, a rigid container or flexible container of bag type. The device D is intended to make it possible to connect in a sealed manner the interior volumes of the enclosure to the external system and to enable a sealed transfer between the two volumes, to protect the objects contained in the sealed volumes and/or to protect the external environment from these objects. For example, the enclosure 2 may form part of an isolator system, in particular a confinement zone of the isolator, a sterile confinement zone or a radioactive confinement zone, which may be used to manufacture products in the nuclear, pharmaceutical or food processing industries for example.

Examples of device for sealed connection are described in the document FR 2 695 343 and in the document U.S. Pat. No. 9,754,691.

The device for sealed connection D comprises a flange 6 mounted in the wall 4 and delimiting an opening 8, a door 10 intended to close in a sealed manner the opening 8. The device for sealed connection D also comprises means for connecting to an external system, for example a container C (FIG. 14), also comprising a flange 9 bordering an opening and a door 11 closing in a sealed manner said opening. The connection means are for example of bayonet type. Each door is also connected to its flange by a bayonet connection. The connection device has a symmetry of revolution of axis X1.

In an exemplary embodiment, the connection device also comprises means for coupling the two flanges 6 and 9 with each other and a control ring mounted outside of the enclosure around the flange 6, the control ring controlling the means for coupling the two doors 10 and 11 and for unlocking the door 11 of the container C, means for releasing the other door and opening the two doors 10 and 11 enabling sealed communication between the two volumes. The means for coupling the two flanges 6 and 9 and the control ring are rotationally moveable with respect to the enclosure and to the container, and by virtue of their rotation ensure all the steps required to obtain a sealed connection and this is so without pivoting one of the closed volumes. In this example, no rotation of the second closed volume is required.

In another exemplary embodiment, the coupling of the two flanges, the two doors and the opening of the doors are ensured by the rotation of the container around its axis and with respect to the enclosure.

Figure 14:
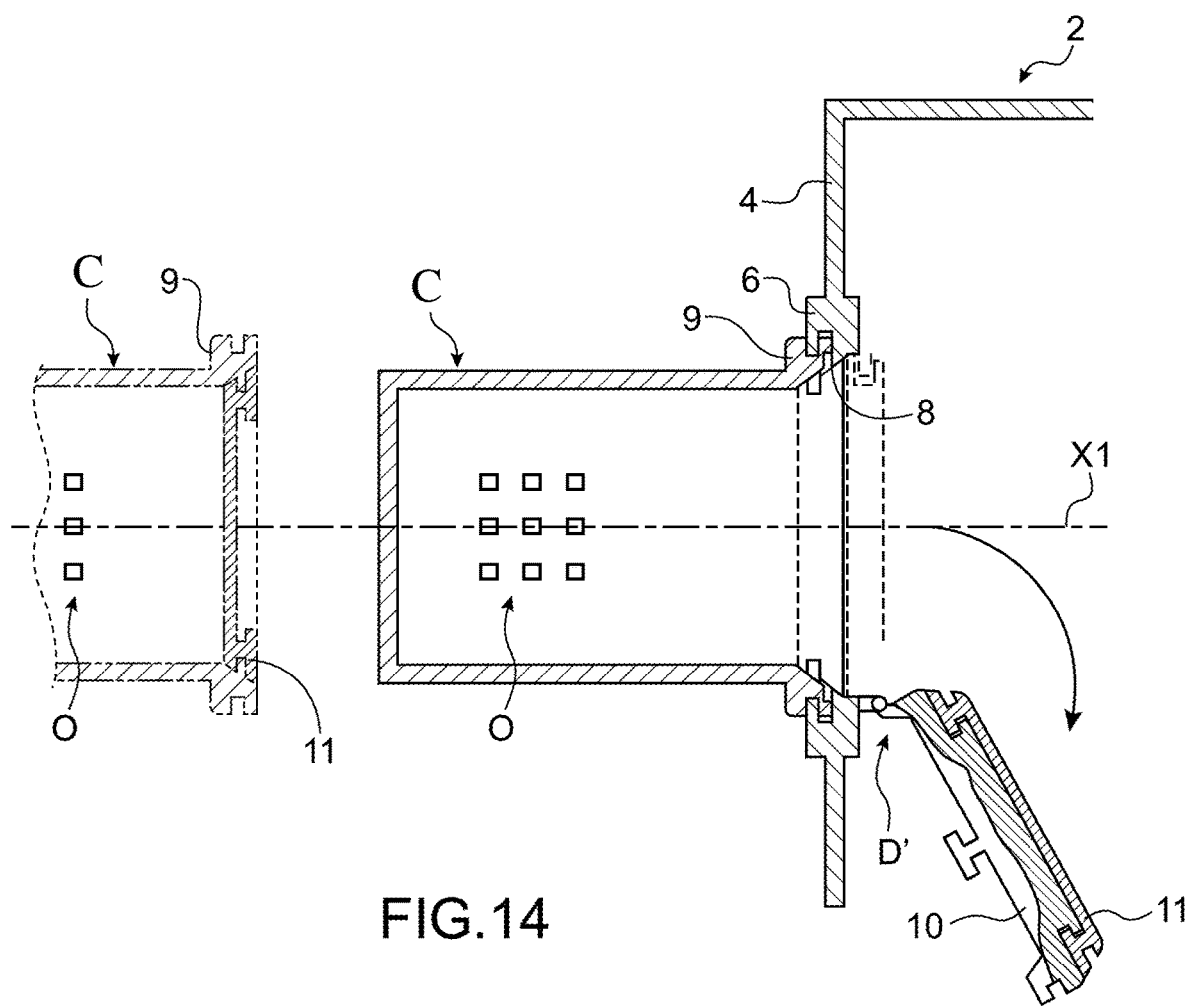
FIG. 14 is a schematic representation of a top view in section of an enclosure provided with a device for sealed connection to which is connected a container.

An example of operating procedure for connecting in a sealed manner the enclosure and a container will now be described with the aid of FIG. 14. In dotted lines is represented the closed container before its connection to the enclosure. The container contains objects O represented schematically, that it is wished to transfer into the enclosure. The transfer system is not represented.

The flange 9 of the container is coupled in a sealed manner to the flange 6 of the enclosure by means of a bayonet connection. Simultaneously, the door 11 of the container and the door 10 of the enclosure are coupled to each other in a sealed manner by a bayonet connection. The exterior faces of the doors 10, 11 are isolated with respect to the interior volume of the container and the enclosure, the assembly formed by the two doors 10, 11 coupled to each other may be removed by making it pivot around its axis, and next be displaced in the enclosure. The two volumes are then in communication in a sealed manner and the transfer of objects between the two volumes may be carried out.

Figure 15A:
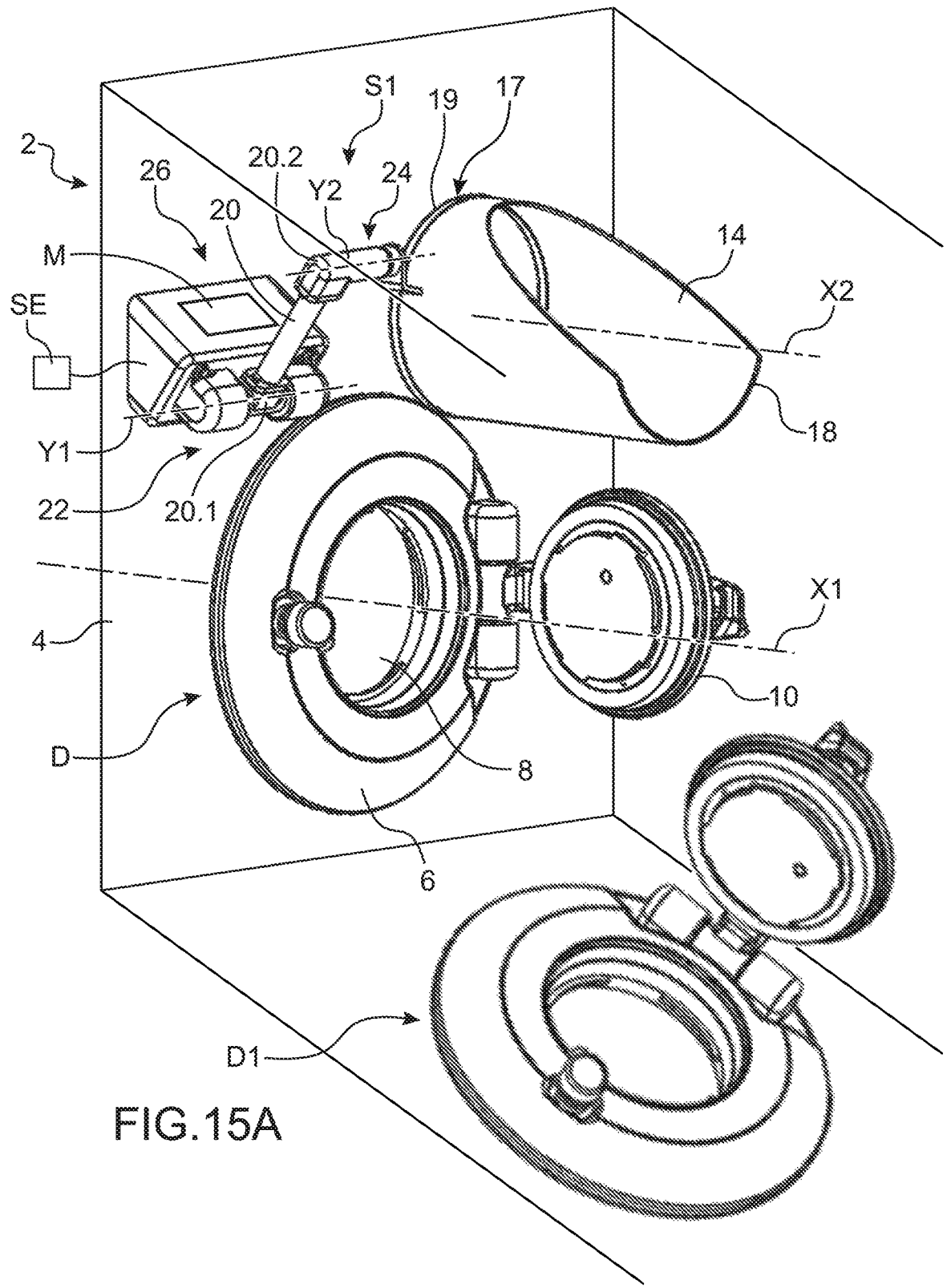
FIGS. 15A to 15C are schematic representations of other examples of enclosure.

The enclosure comprises a transfer system S1 making it possible to guide objects coming from the exterior to an interior zone of the volume of the enclosure. For example, these objects are stoppers contained in a bag and which are poured into the interior of the enclosure. The system S1 is intended to facilitate the treatment and/or the transfer of objects/of elements into the enclosure 2, for example to facilitate the supply of objects/of elements to a conveyor belt or, during a later treatment, transfer into a separate sealed container, through another device for sealed connection D1 such as represented in FIG. 15A.

The transfer system S1 comprises a part 14 ensuring the guiding of the flow of objects, designated chute and forming a sort of funnel.

In the example represented, the chute 14 has substantially the profile of a truncated cone with circular section with a large base provided with a docking edge 17 intended to come into contact with the flange 6 and to border the opening and the small base 18, forming a pouring edge, oriented towards the zone where it is wished to orient the object(s). In the example represented, the truncated cone is cut by a plane inclined with respect to its axis of revolution X2, conferring on it a tapered shape. The chute is intended to take a docked position, in which the docking edge 17 is bearing against the flange 16, and a moved away position, designated rest position, in which the chute 14 is moved away from the opening and is on standby for a new transfer. Advantageously, the docking edge 17 is covered by a bead made of flexible material 19, for example made of elastomer, to avoid damaging the flange during docking. In an exemplary embodiment, the chute 14 may have a downstream surface in the direction of flow of objects, which is inclined with respect to the axis of the docking edge 17 to facilitate the transfer of objects.

In the example represented, the transfer system also comprises an arm 20 comprising a first longitudinal end 20.1 and a second longitudinal end 20.2, a first rotating hinge 22 of axis Y1, by which the arm is rotationally hinged on the wall 4 by its first longitudinal end 20.1, and a second rotating hinge 24 of axis Y2, by which the arm is rotationally hinged on the wall 4 by its second longitudinal end 20.2. The axis Y2 is parallel to the axis Y1.

The transfer system also comprises actuating means 26 to rotationally drive the arm around the axis Y1 and the chute around the axis Y2. In this example, the actuating means 26 comprise an electric motor M represented schematically.

According to the first embodiment, the transfer system is such that it maintains the chute in a given orientation with respect to the connection device D and thus to the wall 6 bearing it. The orientation of the chute in the present application corresponds to the axis of the docking edge. In FIG. 1, the axis of the part of the chute on which the objects are displaced and the axis of the docking edge are merged. In other exemplary embodiments, they are secant. The maintaining of the orientation of the chute with respect to the connection device means that the axis of the docking edge and the axis of the connection device have the same angular orientation with respect to each other, and/or that the axis of the docking edge is orthogonal to the axis of the wall 4, whatever the position of the chute in the enclosure, for example the axis of the docking edge is parallel to that of the connection device, whatever the position of the chute in the enclosure. In the examples represented, the plane containing the opening of the device for sealed connection and the wall are merged. In other examples, the wall extends in at least two inclined planes, a part of the wall containing the device for sealed connection is in a plane different from the other part(s) of the wall, the maintaining of the orientation may then be that between the axis of the docking edge and the part of the wall containing the device for sealed connection or that of the axis of the docking edge and the other part of the wall. In other examples, the device for sealed connection is mounted in an inclined wall, the opening being in a plane distinct from that of the whole wall, the maintaining of the orientation is then achieved between the axis of the docking edge and that of the connection device or between the axis of the docking edge and that of the inclined wall. The maintaining of the orientation is thus that of the axis of the docking edge with respect to an element of the enclosure.

In this exemplary embodiment represented in FIGS. 1 to 4, and in a very advantageous manner, the mechanical means are such that they ensure a maintaining of the axis X2 of the docking edge 17 parallel to the axis X1 of the connection device and perpendicular to the wall 4. Thus, during docking, the docking edge 14 arrives parallel to the flange and all the docking edge enters into contact with the flange 6 in a simultaneous or quasi-simultaneous manner. In rest position, the docking edge 17 moves closer to the wall 4 and the pouring edge 18 is oriented towards the interior of the enclosure.

Figure 4:
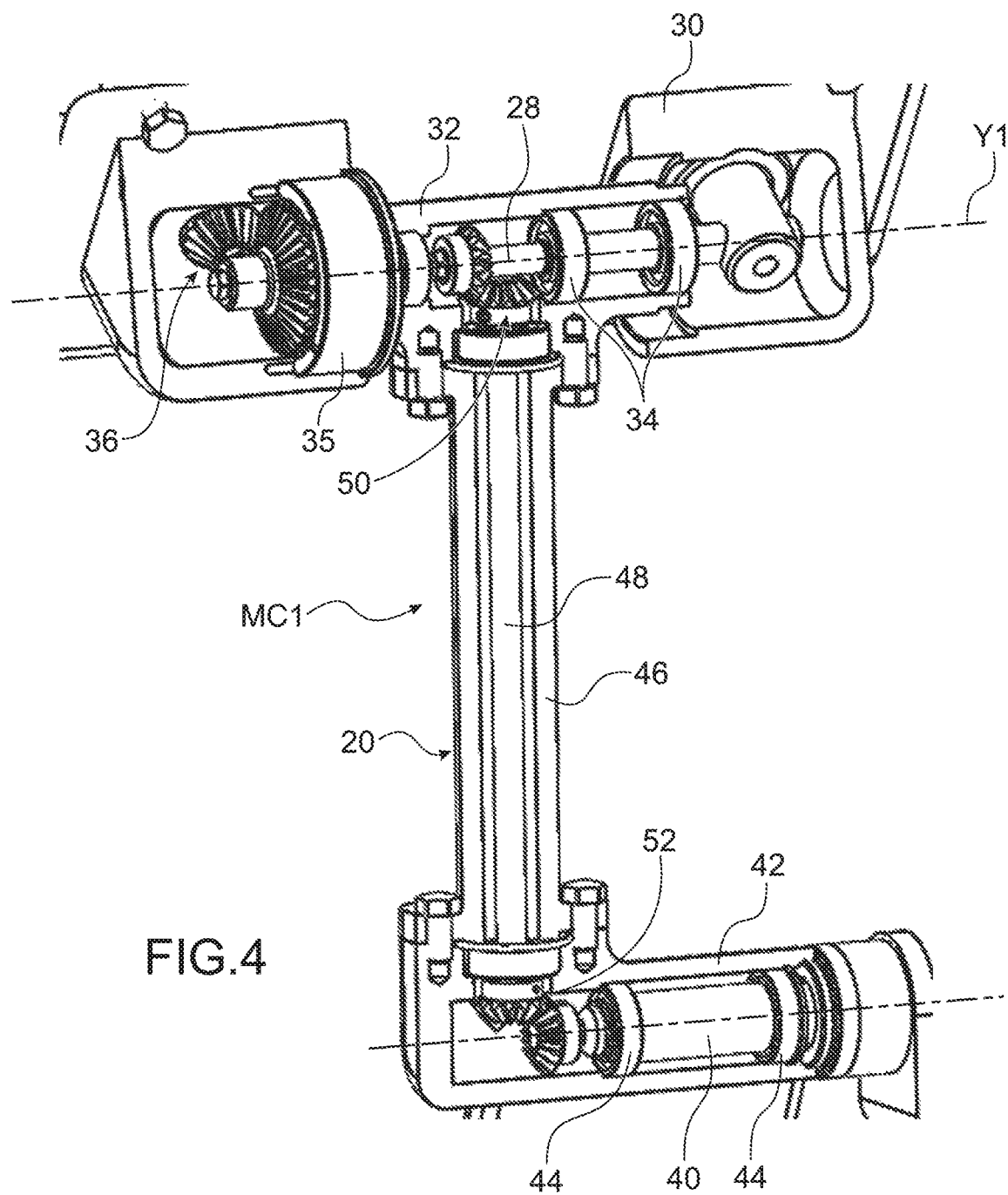
FIG. 4 is a partially cut-off view of mechanical means of the transfer system of FIG. 1.
Figure 5:
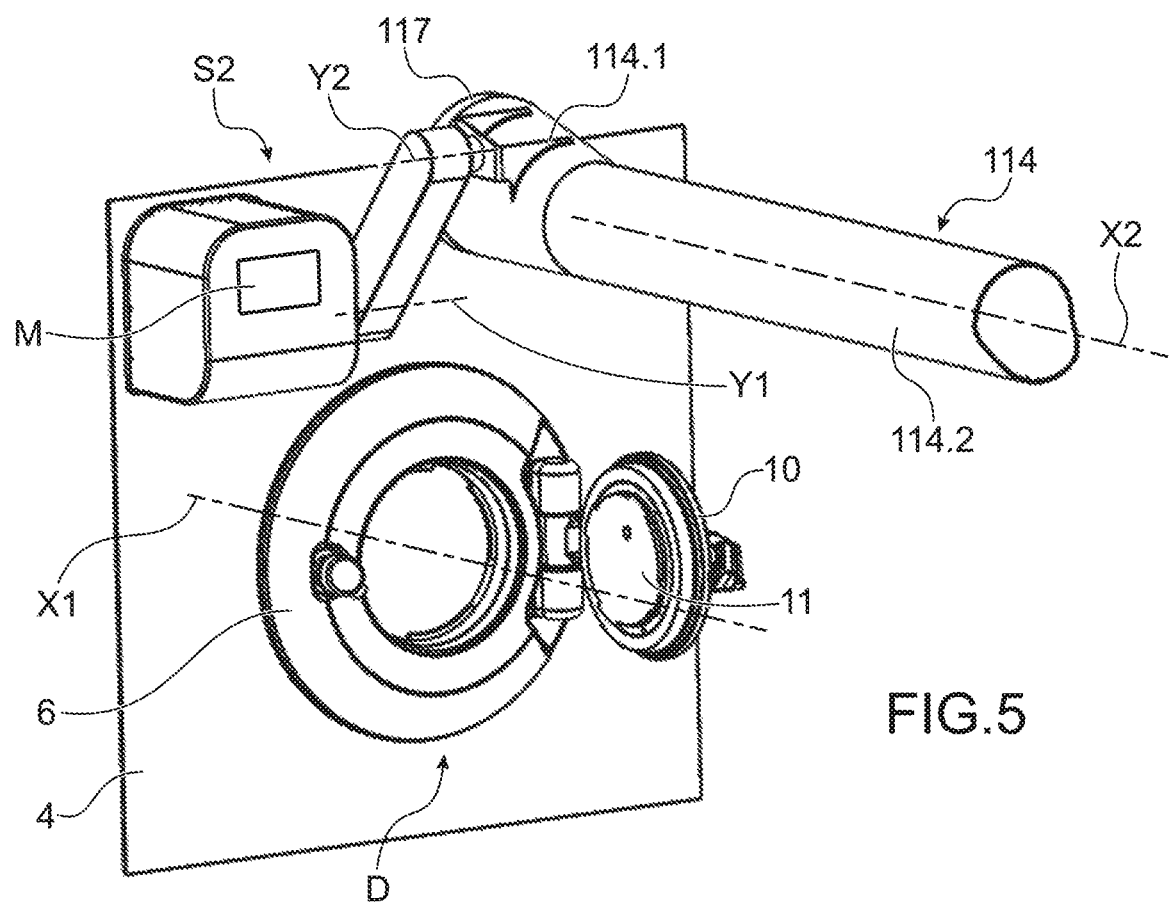
FIG. 5 is a perspective view of the inside of an enclosure provided with a transfer system according to a second exemplary embodiment, the transfer system being in rest position.
Figure 6:
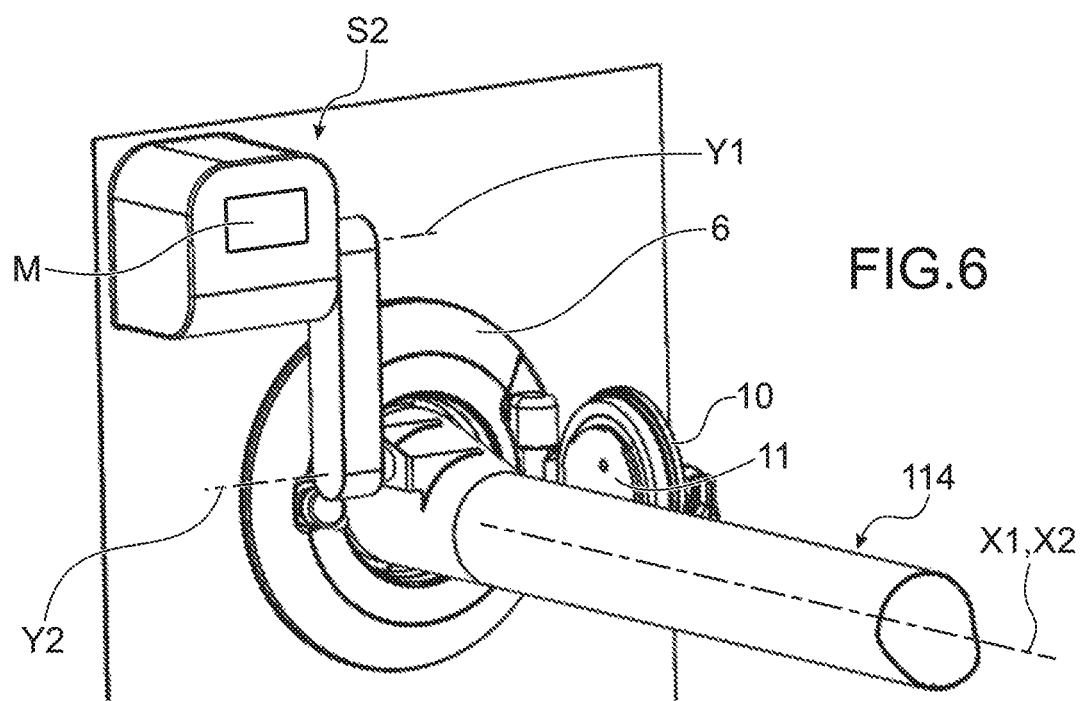
FIG. 6 is a perspective view of the enclosure of FIG. 5, the transfer system being in docked position.
Figure 7:
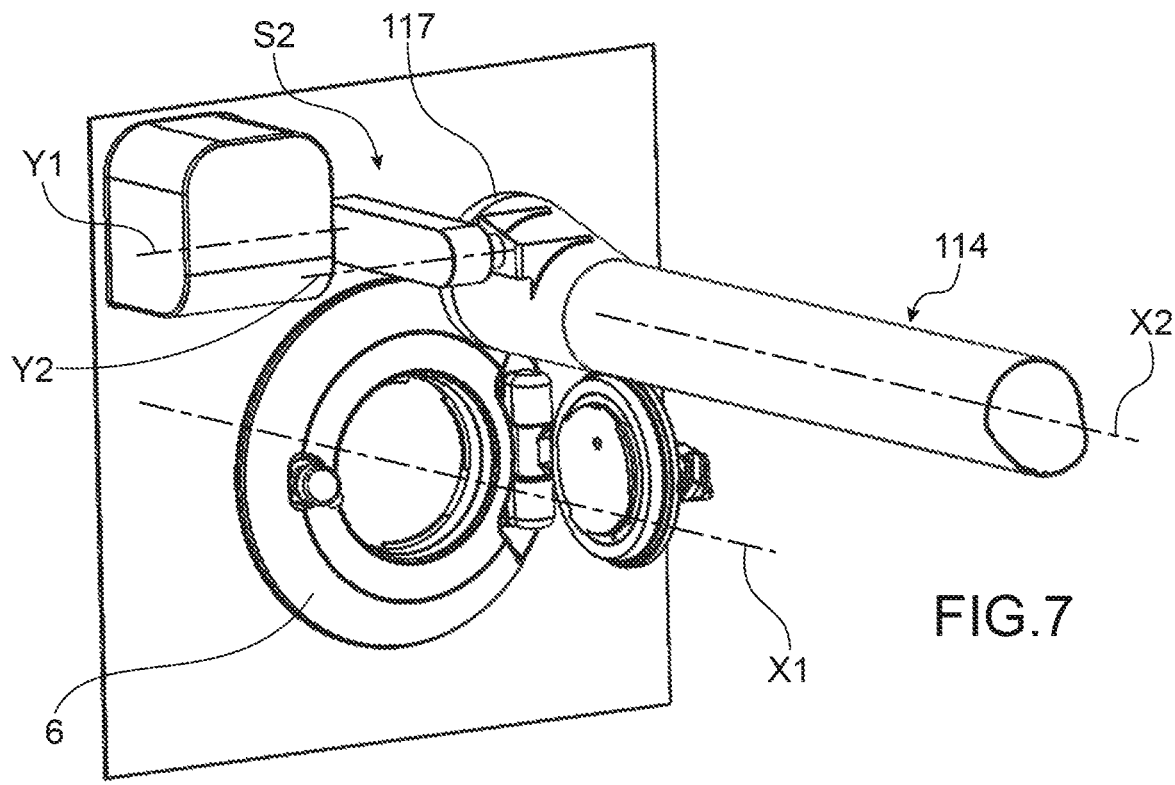
FIG. 7 is a perspective view of the enclosure of FIG. 5, the transfer system being in intermediate position.
Figure 8:
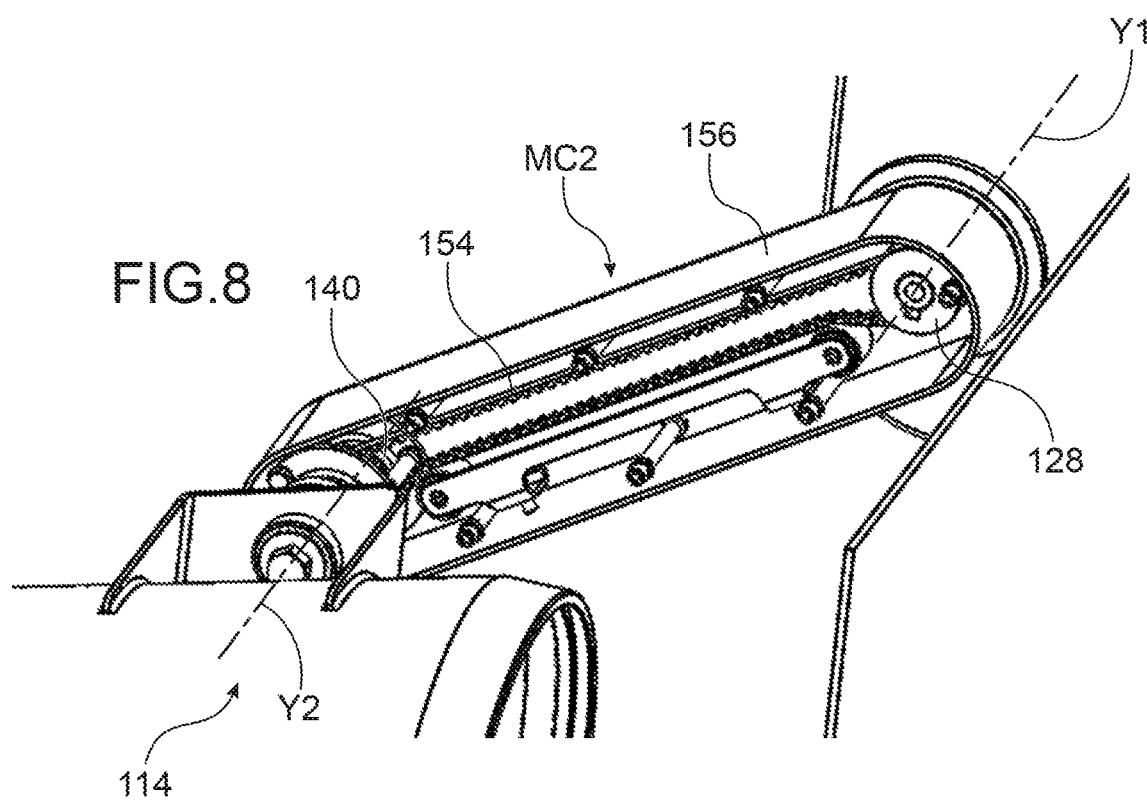
FIG. 8 is a partially cut-off view of mechanical means of the transfer system according to the second exemplary embodiment.
Figure 9:
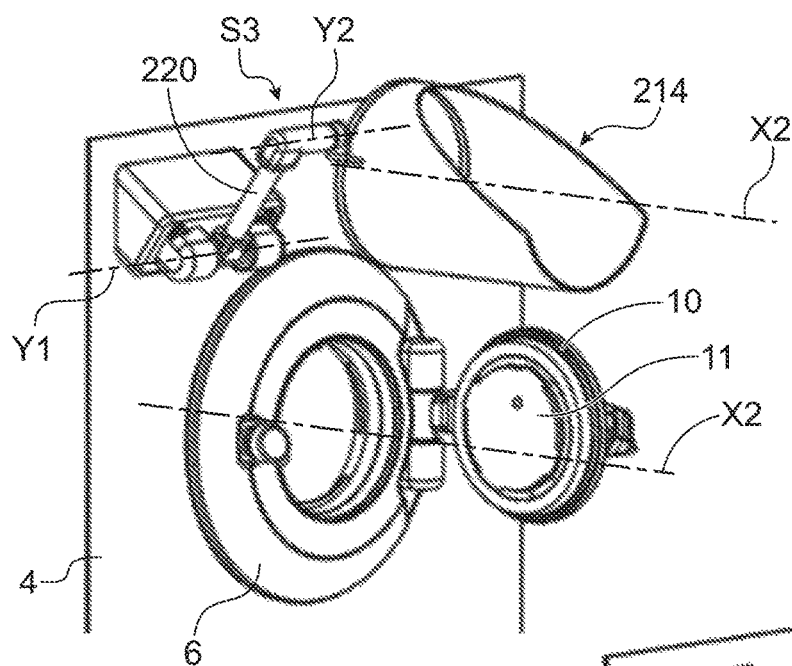
FIG. 9 is a perspective view of the inside of an enclosure provided with a transfer system according to a third exemplary embodiment, the transfer system being in rest position.
Figure 10:
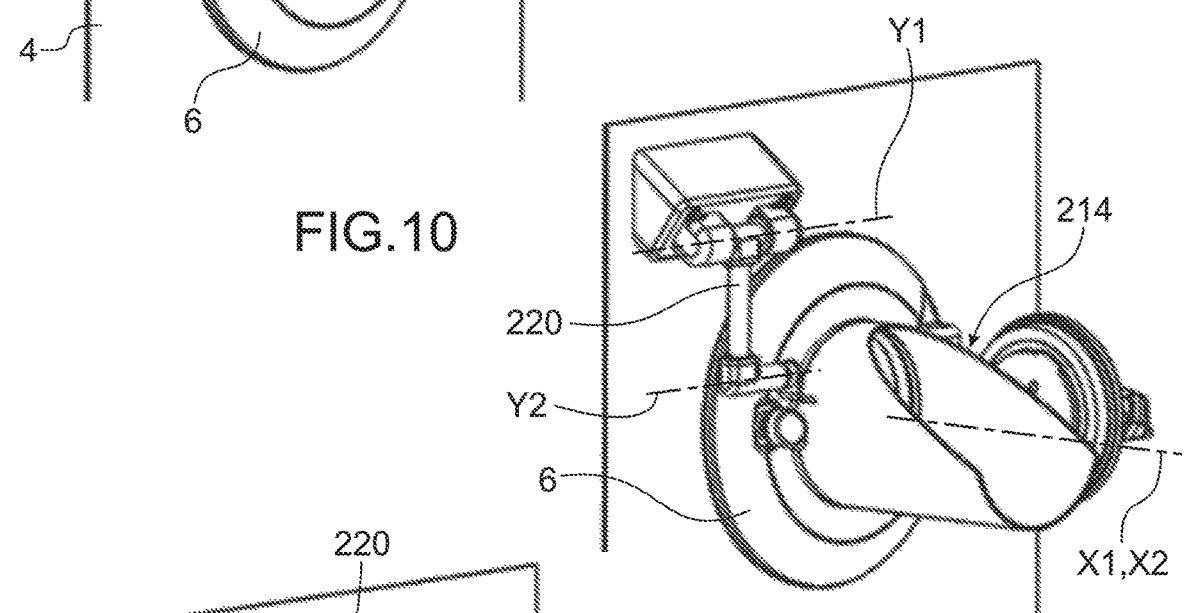
FIG. 10 is a perspective view of the enclosure of FIG. 9, the transfer system being in docked position.
Figure 11:
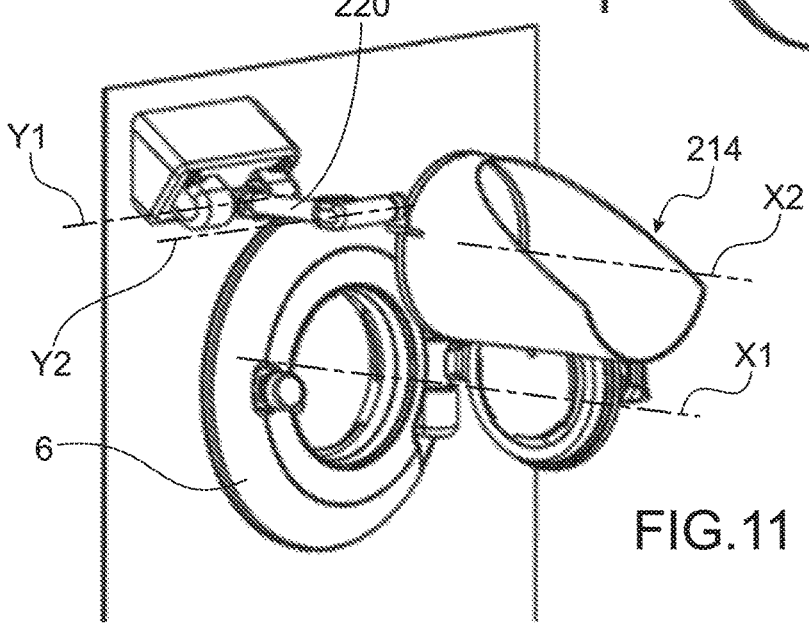
FIG. 11 is a perspective view of the enclosure of FIG. 9, the transfer system being in intermediate position.
Figure 12:
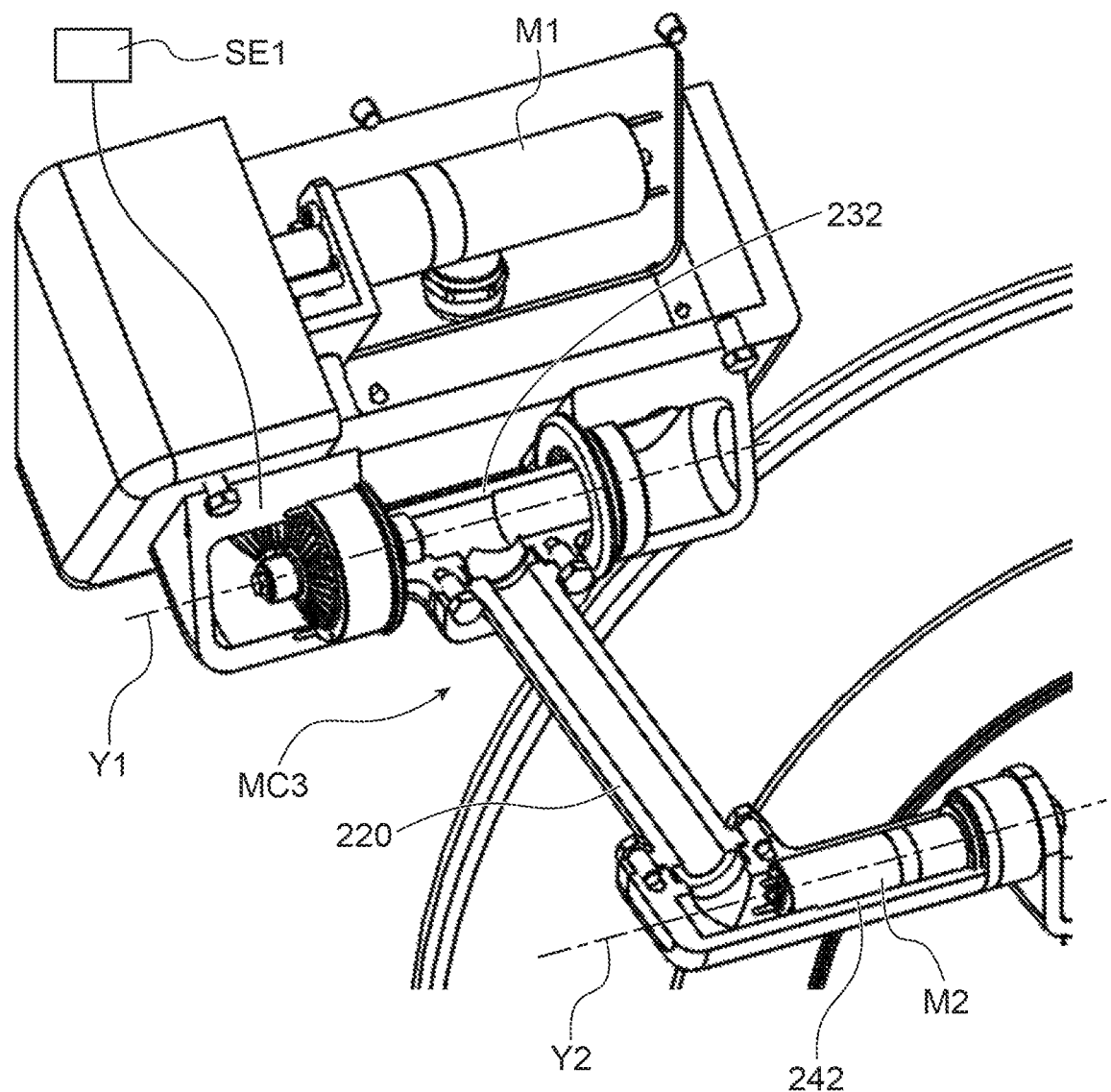
FIG. 12 is a partially cut-off view of mechanical means of the transfer system according to the third exemplary embodiment.

In the first exemplary embodiment, the maintaining of the orientation of the chute is carried out by mechanical means MC1 visible in FIG. 4.

The mechanical means MC1 comprise a first interior axis 28 of axis Y1 mounted fixed on a plate 30 intended to be fixed on the wall 4 of the enclosure, a first exterior axis 32 concentric with the first interior axis 28 and surrounding it, mounted rotationally moveable around the first interior axis 28 by means of bearings 34. Bearings 35 are also provided between the first exterior shaft 32 and a casing 37. The first exterior axis 32 is intended to be driven by the motor M. In the example represented, a conical wheel angle transmission 36 transmits the rotation of the shaft of the motor M to the first exterior axis 32. In an alternative, the shaft of the motor is parallel or aligned with the exterior axis.

The mechanical means MC1 also comprise a second interior axis 40 rotationally coupled to the chute 14 and mounted in a second exterior axis 42, and forming the second rotating hinge. Bearings 44 are provided between the second interior axis 40 and the second exterior axis 42. The arm 20 comprises an exterior shaft 46 rigidly connecting the first exterior axis 32 and the second exterior axis 42, and an interior shaft 48 mechanically connecting the first interior axis 28 and the second interior axis 40 and ensures the maintaining in position of the chute 14.

The interior shaft 48 is mechanically connected to the first interior axis 28 by an angle transmission 50 and to the second interior shaft 40 by a second angle transmission 52. In this example, the angle transmission 52 is at a longitudinal end of the second interior axis 40. In an alternative, the angle transmission 52 is situated in an intermediate position of the second interior axis 40.

The whole mechanical elements of the transfer system is shrouded in order to limit the emission of particles to the interior of the enclosure due to rubbing. Moreover, such a shroud facilitates the steps of cleaning the interior of the enclosure. The shroud is individual to each mechanical part or body and/or common to several mechanical parts or bodies.

The operation of these mechanical means MC1 will now be described.

The electric motor M is activated, it rotationally drives the first exterior shaft 32 around the axis Y1 freely with respect to the first interior axis 28, which rotationally drives the exterior shaft 46 and the second exterior axis 42. Due to the link ensured by the interior shaft 48 and the angle transmissions, the orientation of the second interior axis 40 is maintained fixed while pivoting with respect to the axis Y1.

Thus, the chute 14 that is fixed with respect to the second interior axis 40 has a fixed orientation while being displaced in the cell.

The operation of the transfer system will now be described.

The doors of the enclosure and the container coupled together have been removed from the connection device.

Figure 2:
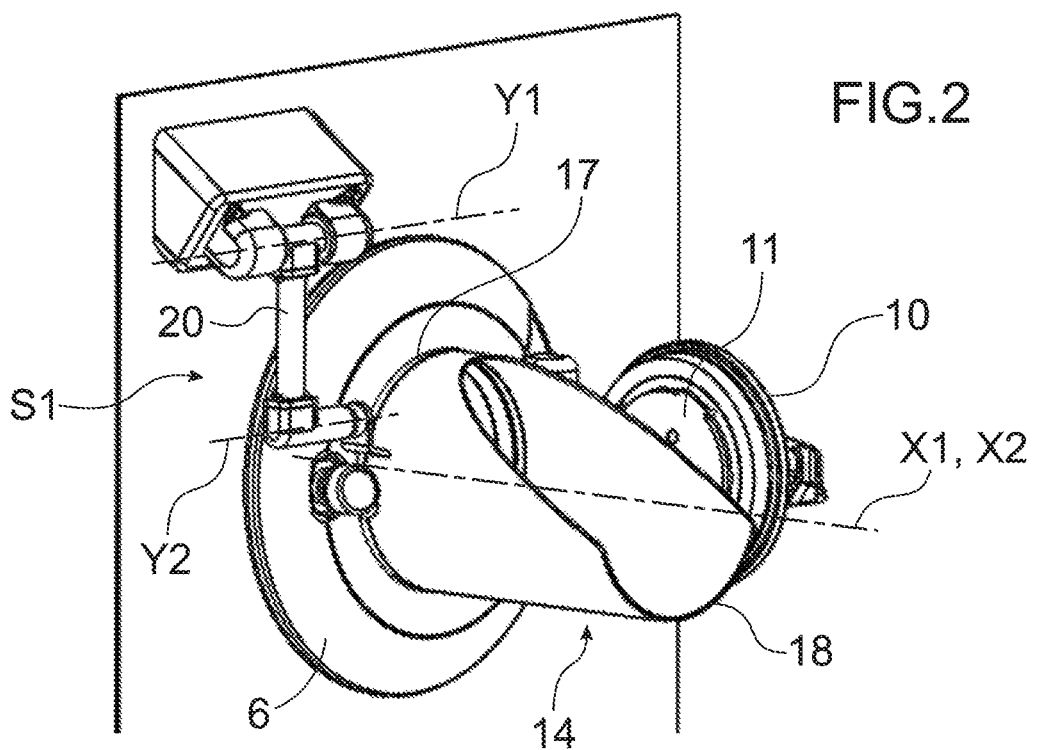
FIG. 2 is a perspective view of the enclosure of FIG. 1, the transfer system being in docked position.

The electric motor M is activated, the arm 20 pivots around the axis Y1, causing the arm 20 to come closer to the wall 40. The chute 14, and in particular the docking edge 17, comes closer to the flange 6 parallel thereto due to the mechanical means MC1 until coming into contact with the flange 6 and bordering the opening. The chute is in docking position (FIG. 2).

Figure 3:
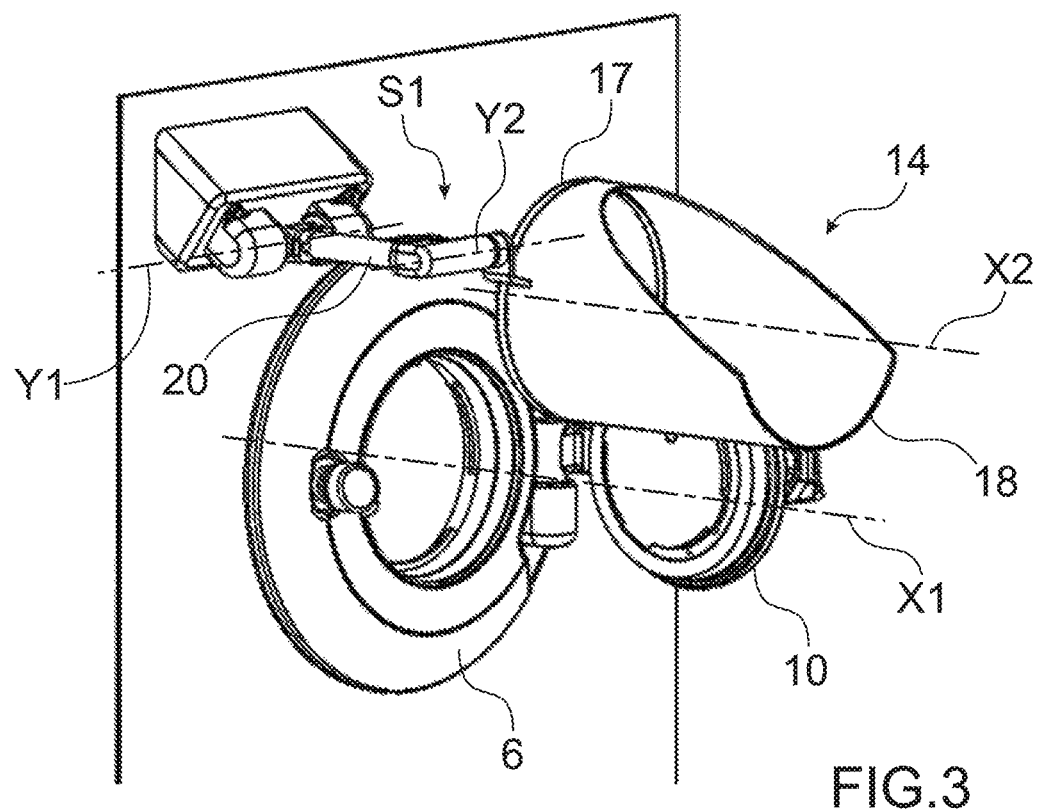
FIG. 3 is a perspective view of the enclosure of FIG. 1, the transfer system being in intermediate position.

When it is wished to remove the chute, for example to be able to put the doors back in place, the motor is activated and turns in the opposite direction. The arm 20 pivots around the axis Y1 in the opposite direction. In a first phase, the arm moves away from the wall 4 (FIG. 3). The docking edge 17 moves away from the flange 6, while remaining parallel thereto. In a second phase the arm 20 comes closer to the wall 4 and the docking edge 17 comes closer to the wall 4 parallel thereto and reaches its rest position (FIG. 1).

The pouring edge is oriented towards the interior of the enclosure such that the place required to house the chute in rest position is reduced with respect to a chute in vertical position in the representation of FIG. 1, in this case it would be necessary to provide an enclosure of greater height.

The activation of the electric motor may be automatic following the occurrence of an external event, for example following the detection of the connection of a container and the opening of the doors. In another example, the motor is activated manually by a user through an external user control or a control interface of the user.

In this example, the rest position of the chute is situated above the connection device. In an alternative, the rest position is situated below the connection device or laterally with respect to the connection device.

In an exemplary embodiment, the chute comprises a downstream part formed so as to be able to be rotated on itself to facilitate the fall of objects/elements to transfer and to ensure that all the objects/elements have been transferred to the conveyance line for example. For example, the rotation may be activated as of the activation of the system, or from the moment when the putting in place with respect to the connection device with a view to a transfer has terminated or beyond a certain time to cause the transfer of objects/elements potentially remaining on the chute.

In a very advantageous manner, the transfer system comprises detection means SE for detecting the position of the chute or more generally the state of the transfer system. In a very advantageous manner, the information emitted by these detection means is supplied to a control unit, which compares the opening and closing state of the connection device in order to prevent any putting in place of the chute 14 if the doors are in closed position, or any putting back in place of the doors on the flanges, if the chute 14 is in docking position. The detection means SE comprise for example an inductive sensor or a code wheel for example arranged at the level of the first exterior axis 32. The connection device of the prior art in general comprises means indicating its state, for example if the doors are in place or not, in locked position or not. The detection means may comprise one or more optical sensors detecting if the opening is clear or closed. The sensors may for example provide information directly to the operationally associated control unit and/or connected to the electric motor to cancel any activation of the motor when the detection sensor detects that the opening is blocked by the door 10 or by another object. In another exemplary embodiment, the sensor(s) are used for the automatic activation of the electric motor M. In another exemplary embodiment, the sensor(s) are used to detect and verify the position and/or the angular orientation of the chute.

In an exemplary embodiment, means for manually actuating the transfer system are provided, for example in the event of breakdown of the electric motor. For example, they comprise a lever arranged outside of the enclosure and traversing the wall 4 in a sealed manner and is mechanically connected to the first exterior axis 32, and means for disengaging the motor. The exterior lever is rotationally coupled to the first exterior axis 28 through the wall. The axis Y2 also forms the axis of rotation of the lever. When the lever is rotated for example by the user, it simultaneously rotates the first exterior axis 28. The remainder of the operation of the system is similar to that described above with the electric motor. The passage from the rest position to the docked position is obtained by displacing the lever in a rotational direction. The rotational displacement in the opposite direction causes the passage from the docked position to the rest position.

In an alternative, the actuation of the transfer system is carried out in a an exclusively manual manner, for example using the lever described above.

In FIGS. 5 to 8 may be seen a second example according to the first embodiment of the transfer system S2. This differs from the transfer system according to the first exemplary embodiment mainly by the shape of the chute and by the means ensuring the maintaining of the orientation of the chute.

The transfer system S2 comprises a chute 114 including a first part 114.1 of truncated cone shape bearing the docking edge 117 and a second part 114.2 of tubular shape bordering the pouring edge.

The diameter of the docking edge 117 is less than that of the flange and which is housed in the opening.

The chute has a large axial dimension and makes it possible to guide objects more towards the interior of the enclosure than the chute 14.

The transfer system also comprises mechanical means MC2 ensuring a maintaining of the orientation of the chute.

The mechanical means MC2 comprise a toothed belt 154 between the first interior axis 128 and the second interior axis 140, the first 128 and the second 140 interior axis being splined axis. The belt 154 ensures the maintaining of the orientation of the second interior axis 140 and thus the maintaining of the orientation of the chute.

The mechanical means MC2 are confined in a shroud 156 limiting the risks of rejection of particles to the interior volume of the enclosure. This exemplary embodiment has the advantage of offering more silent operation due to the use of a toothed belt, which is generally made of synthetic material. Rollers bearing against the belt are implemented to ensure an adjustment of its tension.

In an alternative, the toothed belt is replaced by a chain and pinions coaxial to the interior axis are fixed thereon.

The operating steps of the transfer system are similar to those described above for the system of FIGS. 1 to 4.

The transfer system of the application is particularly interesting in the case where the chute has a very large dimension along its axis X1. Indeed, it makes it possible to reduce considerably the height of the enclosure, with respect to an enclosure equipped with a transfer system of the prior art.

In FIGS. 9 to 12 may be seen a third exemplary embodiment of the first embodiment of a transfer system S3 implementing two electric motors.

The transfer system S3 comprises a first electric motor M1 mounted on the wall 4 similar to the motor M, and mechanically connected to the first exterior axis 232 in order to drive it rotationally around the axis Y1. It comprises an exterior shaft and a second exterior axis 242, in which is mounted a second electric motor M2 on the shaft of which is integrally rotationally mounted the chute 214.

The motor M2 is then commanded to maintain the orientation of the chute 214 with respect to the axis of the connection device whatever the orientation of the arm 220 with respect to the wall 4. At least one angular position sensor SE1 is implemented to measure the angular position of the arm around the axis Y1, such that the control unit corrects the angular orientation of the chute 214 with respect to the second exterior axis 242. In an alternative, an angular position sensor is implemented to measure the angular position of the axis X2 of the docking edge X2 of the chute 214 with respect to Y2 and the control unit corrects this orientation.

The means for electrically supplying the second motor M2 are not represented for reasons of clarity, but they comprise for example electric wires connecting the terminals of the second electric motor M2 and an electric current source, and running in the arm 20, which is empty in this embodiment.

This third exemplary embodiment has the advantage of reducing the moving mechanical parts, which reduces the risks of generating particles by abrasion.

In another exemplary embodiment, it is possible to envisage that the first 232 and second 242 exterior axis are not always parallel in the course of the transfer. For example, during docking and during transfer the axis 232 and 242 are parallel, and during undocking the chute is inclined downwards to ensure that all the objects have indeed been transferred and that none of them remains any more on the chute, before repositioning the transfer system in its rest position.

According to an additional characteristic, the transfer system may comprise means that are implemented to block the transfer system at least in docking position and in rest position to avoid any uncontrolled displacement. The blocking means comprise for example an electric brake for example to brake the rotation of the first exterior axis 21 in the first exemplary embodiment, or mechanical means preventing for example the first exterior axis 32 from pivoting around the axis Y1, for example it may be a retractable pin penetrating into the first exterior axis 32 perpendicular thereto and preventing its rotation as long as the motor is not reactivated.

In the embodiments described in detail, the orientation of the chute is maintained such that the docking edge is permanently displaced in planes parallel to the connection device and orthogonal to the axis X1 of the connection device. In an alternative, it may be displaced in an inclined plane. Indeed, in the case of the second exemplary embodiment, the docking edge penetrates into the opening of the flange, it is then not necessary that the docking edge is parallel to the flange.

In another embodiment, the orientation of the chute is not maintained and the chute may have at least one first orientation during its moving away from or its coming closer to the connection device and a second orientation during docking, at the moment from which the docking edge may be positioned parallel to the flange. In rest position, the axis of the chute may be inclined with respect to the upper wall, nevertheless offering a reduced bulk compared to the transfer system of the prior art.

Figure 13:
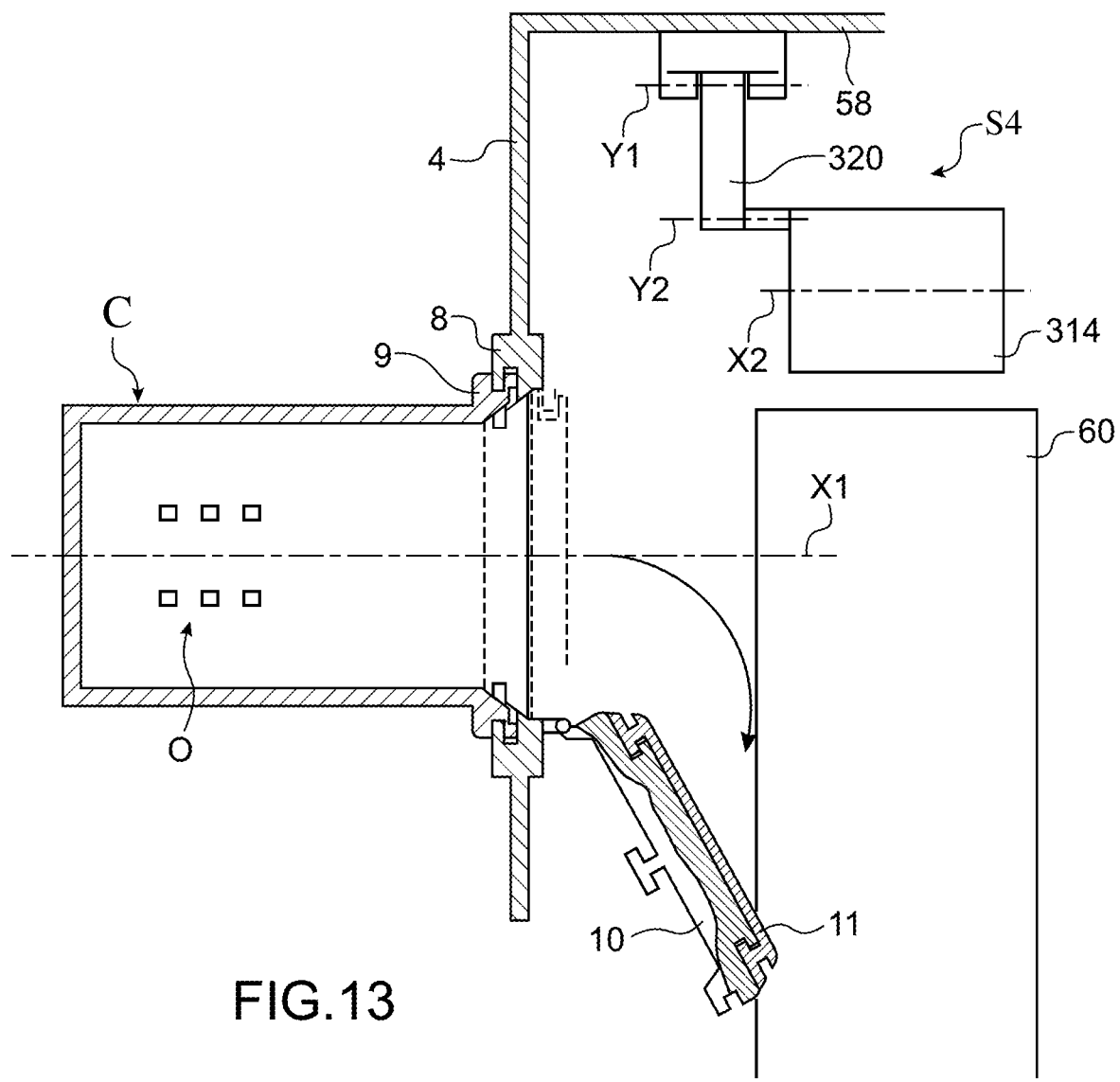
FIG. 13 is a schematic representation of a top view in section of an enclosure comprising a transfer system according to another exemplary embodiment.

In the exemplary embodiments represented, the transfer system is fixed on the wall bearing the connection device. In FIG. 13 may be seen an exemplary embodiment in which the transfer system S4 is fixed to a wall other than the wall bearing the connection device, for example a wall 58 adjacent to the wall 4. The system is in docked position. Due to the rotational hinging in the shaft 320 and the chute 314, such a configuration is made possible. In this second embodiment, the chute is not maintained along a given orientation with respect to the connection device. The third exemplary embodiment represented in FIGS. 9 to 12 implementing two motors is particularly suited to the second embodiment, indeed the orientation of the chute being controlled by the motor, it suffices to manage the second motor M2 in an appropriate manner to modify the orientation of the chute during the actuation of the transfer system.

In the example of FIG. 13, a transfer line 60, on which it is wished to convey objects, is represented.

The means for detecting the position/state of the transfer system and the state of the connection device may be implemented in all the exemplary embodiments.

Figure 15B:
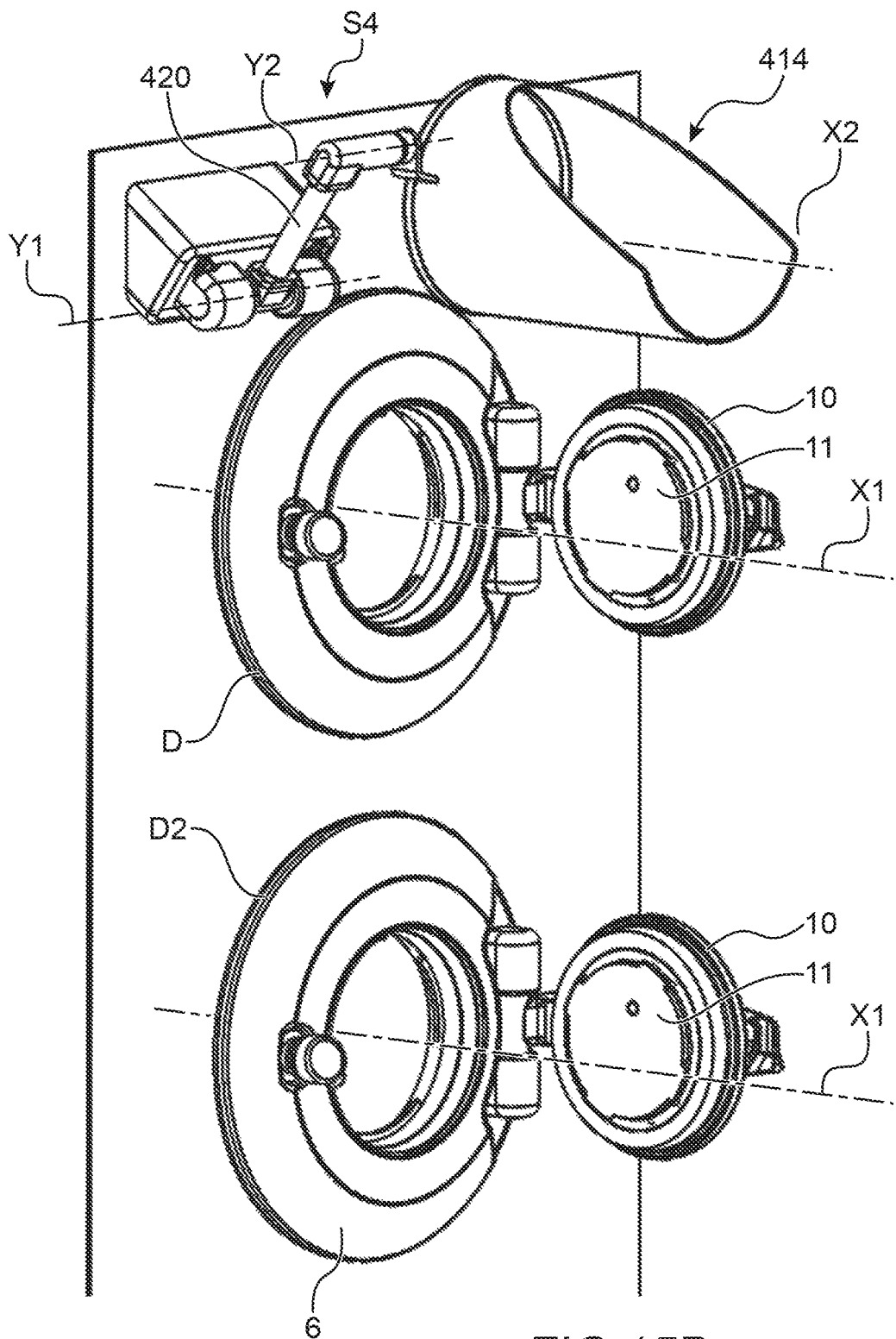
Figure 15C:
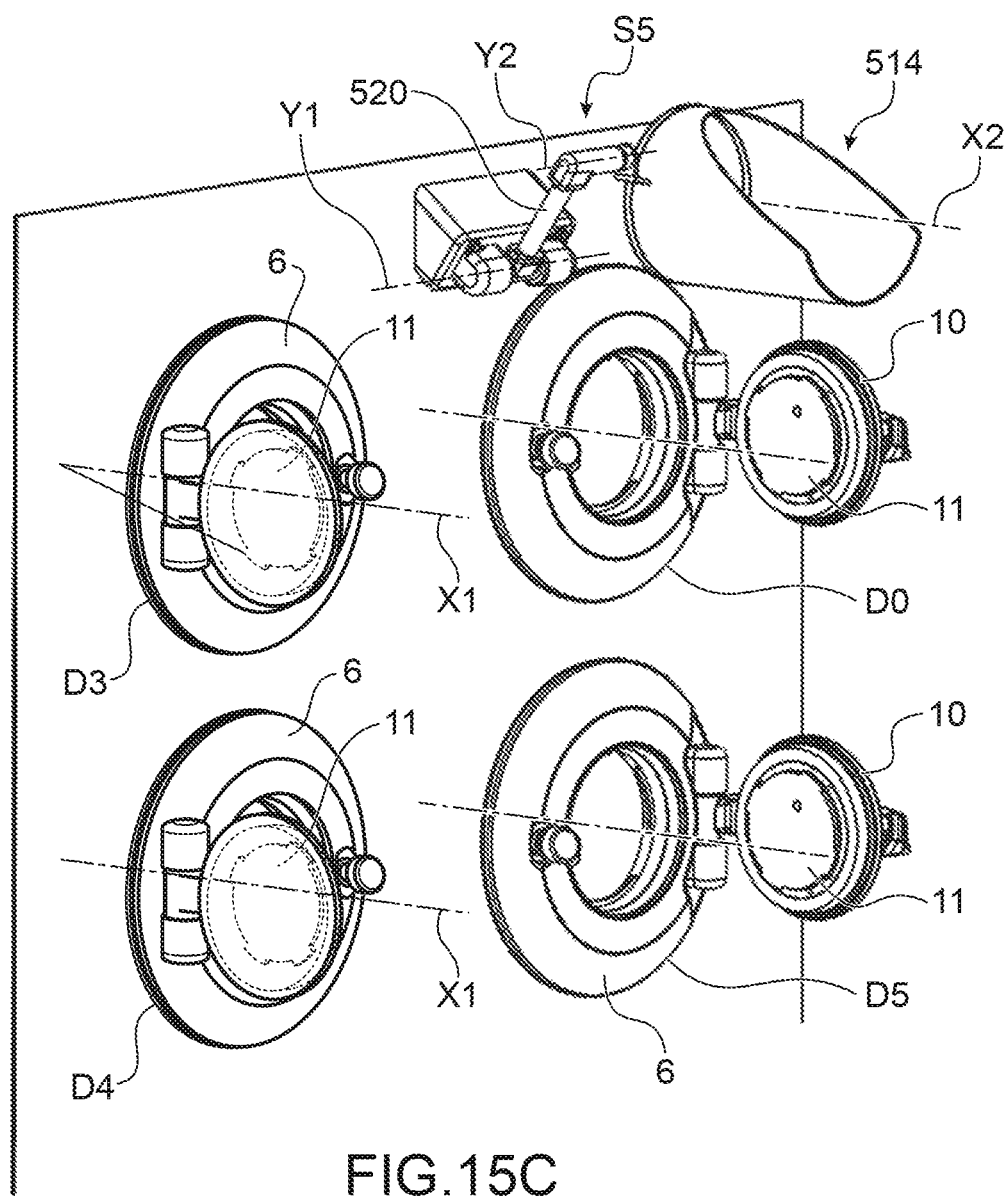

In FIGS. 15A to 15C may be seen examples of sealed enclosures comprising several connection devices on the same wall or on different walls. The transfer system may be used to dock several connection devices. In FIG. 15A, the enclosure comprises a second device D1 in a wall perpendicular to the wall 2 comprising the connection device D. In FIG. 15B, the other device D2 is in the same partition 2, the transfer system S1 may then be used to transfer objects coming from the container connected to the device D or D1. In FIG. 15C, all the devices D and D3 to D5 are on the same wall, the transfer system may be used or not with all or part of the devices D3 to D5. The enclosure may comprise several connection devices distributed on one or several walls and several transfer systems.

In the examples represented, the chutes have substantially circular shapes and the docking edge and the pouring edge are in substantially parallel planes. In an alternative, the docking edge and the pouring edge are in non-parallel planes, the chute having an inclined axis with respect to the axis of the docking edge, for example to guide objects to the bottom of the enclosure.

In another exemplary embodiment, the transfer system comprises several arms hinged with respect to each other between the first pivot hinge and the second pivot hinge.

The transfer system according to the present description applies to enclosures comprising any type of device for sealed connection and not only those implementing bayonet connection means. The device(s) for sealed connection may implement retractable pins, pawls, be of magnetic type, etc.

The objects described in this application may be implemented in all technical fields requiring a transfer of objects between two closed volumes and isolated from the external environment.

The invention claimed is:

1. A transfer system for a sealed enclosure, said sealed enclosure defining a first closed volume and comprising at least one device for sealed connection intended to connect the first closed volume to a second closed volume, said transfer system being intended to be arranged in said enclosure, said transfer system comprising:
    at least one arm intended to be rotationally mounted on a wall of the sealed enclosure through a first rotating hinge comprising a first axis of rotation,
    a chute, said chute comprising:
        a docking edge configured to cooperate with the device for sealed connection; and a pouring edge, a second rotating hinge between the arm and the chute, said second rotating hinge comprising a second axis of rotation, and an orientation maintaining device for maintaining the orientation of the chute during displacement in said enclosure, wherein the orientation maintaining device comprises mechanical elements between a first interior axis extending along the first axis of rotation, and a second interior axis extending along the second axis of rotation, said second interior axis being rotationally coupled to the chute and wherein the mechanical elements comprise an interior shaft connected to the first interior axis and to the second interior axis by angle transmissions.

2. The transfer system according to claim 1, in which the first axis of rotation and the second axis of rotation are parallel.

3. The transfer system according to claim 1, in which the docking edge comprises a longitudinal axis, and the orientation maintaining device is configured such that the longitudinal axis of the docking edge is aligned with the axis of an opening of the connection device and/or perpendicular to the wall of the enclosure in which is mounted the device for sealed connection.

4. The transfer system according to claim 1, comprising at least one actuator including at least one electric motor for rotating the system around the first axis of rotation.

5. The transfer system according to claim 1, comprising at least one detector for detecting the configuration of the transfer system and/or the opening state of the connection device.

6. An enclosure defining a first closed volume and comprising a device for sealed connection to a second closed volume, said connection device being mounted in a wall of said enclosure, and comprising a transfer system according to claim 1.

7. The enclosure according to claim 6, in which the first rotating hinge of the transfer system is fixed on the wall in which is mounted the connection device.

8. The enclosure according to claim 6, in which the connection device comprises a bayonet connection device.

9. A transfer method for transferring objects between a second volume and a first volume of an enclosure defining a first closed volume and comprising a device for sealed connection to a second closed volume, said connection device being mounted in a wall of said enclosure, and comprising the transfer system according to claim 1, said transfer method comprising:

connecting the second closed volume to the connection device, removing doors of the enclosure and the second closed volume, positioning the chute adjacent the connection device, transferring objects from the second closed volume to the interior of the enclosure, moving the chute away from the connection device, and putting the doors of the enclosure and the second closed volume back in place.

10. The transfer method according to claim 9, in which the step of connecting is performed by rotating the second closed volume with respect to the enclosure, so as to ensure a connection between flanges of the second closed volume and the connection device and between the door of the second closed volume and the door of the enclosure.

11. The transfer method according to claim 9, comprising detecting the configuration of the transfer system and detecting the position of the doors and emitting a signal to the transfer system to position the chute of the connection device.

12. An actuating method for actuating a transfer system mounted on a wall of an enclosure defining a first closed volume and comprising a device for sealed connection to a second closed volume, said device for sealed connection comprising an opening, said transfer system comprising a chute provided with a docking edge and hinged around a first axis of rotation and a second axis of rotation and an orientation maintaining device for maintaining the orientation of the chute during displacement in said enclosure, wherein the orientation maintaining device comprises mechanical elements between a first interior axis extending along the first axis of rotation, and a second interior axis extending along the second axis of rotation, said second interior axis being rotationally coupled to the chute and wherein the mechanical elements comprise an interior shaft connected to the first interior axis and to the second interior axis by angle transmissions, said actuating method comprising:

moving the chute closer to the connection device to place the chute in a docking position, and moving the chute away from the connection device to place the chute in a rest position, wherein during each of the steps of moving the chute closer and moving the chute away, the chute is rotated around the first axis of rotation and around the second axis of rotation.

13. The actuating method according to claim 12, in which the chute is rotated simultaneously around the first axis of rotation and the second axis of rotation respectively.

14. The actuating method according to claim 13, wherein during the steps of moving the chute closer and moving the chute away, the axis of the docking edge remains parallel to the axis of the connection device.

15. The actuating method according to claim 12, in which in the rest position a pouring edge of the chute is oriented towards the interior of the enclosure.

* * * * *